Aug. 3, 1954

R. P. DUNMIRE 2,685,522

NEW PROCESSES AND EQUIPMENT, ETC

Filed March 5, 1948

INVENTOR:
RUSSELL P. DUNMIRE
BY
*Gordon C. Mack*

ATTORNEY

Aug. 3, 1954   R. P. DUNMIRE   2,685,522
NEW PROCESSES AND EQUIPMENT, ETC
Filed March 5, 1948   3 Sheets-Sheet 2
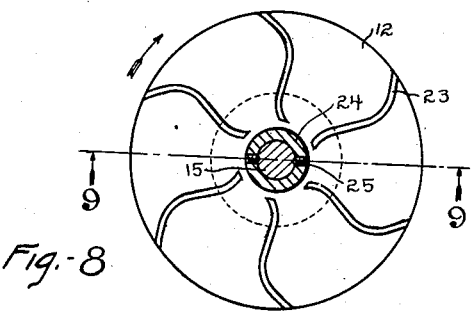
Fig.-8
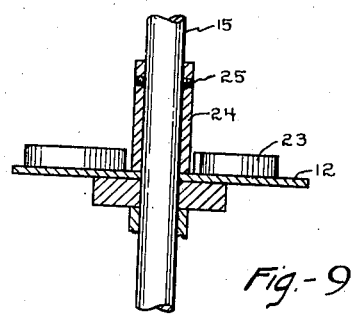
Fig.-9
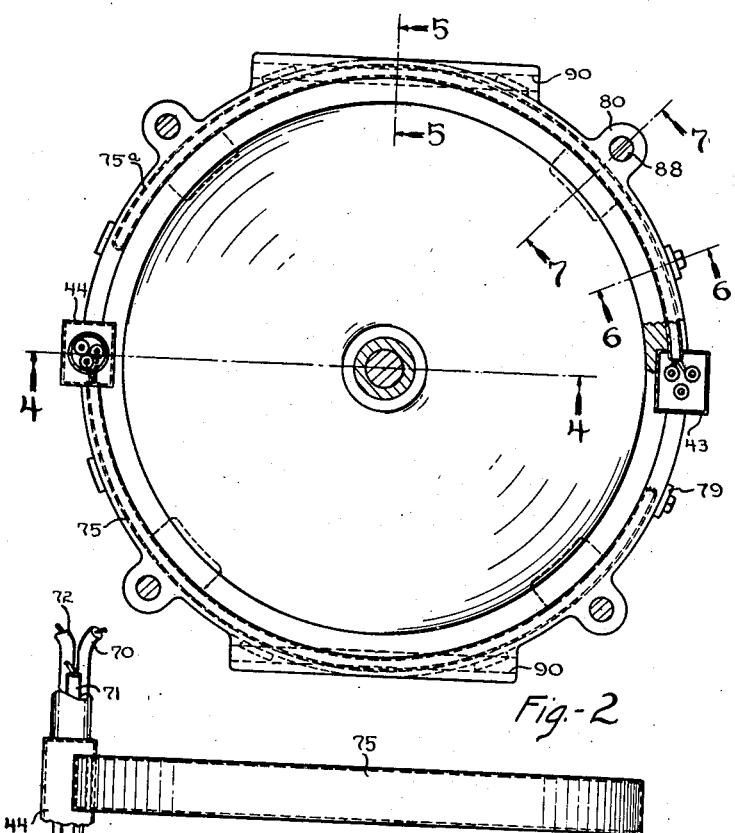
Fig.-2
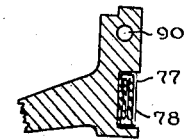
Fig.-5
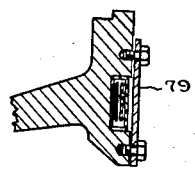
Fig.-6
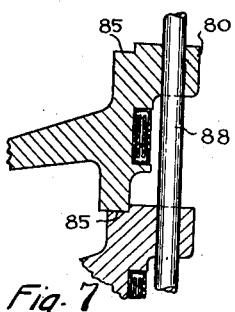
Fig.-7
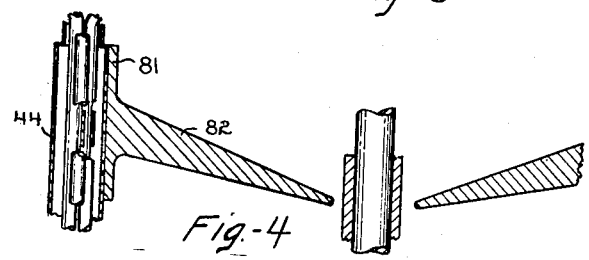
Fig.-3
Fig.-4
INVENTOR:
RUSSELL P. DUNMIRE
BY Gordon C. Mack
ATTORNEY Patented Aug. 3, 1954

2,685,522

UNITED STATES PATENT OFFICE 2,685,522

NEW PROCESSES AND EQUIPMENT, ETC.

Russell P. Dunmire, Chagrin Falls, Ohio

Application March 5, 1948, Serial No. 13,186

16 Claims. (Cl. 99—219)

This invention relates to new processes and equipment designed particularly for use in chemical operations. The chemical treatments include distillation, sterilization, gasification, degasification, impregnation of a liquid with a gas or vapor, and the like. The invention includes—for example—the sterilization of milk and fruit juices, etc., with or without concentration, the purification of water, and the treatment of a molten fat or other liquid which solidifies on cooling.

The apparatus in which these processes may be carried out projects the liquid centrifugally, in the form of discrete particles, from a central source (or sources) in a substantially horizontal plane (or planes) against a vertical wall with sufficient force to overcome the surface tension of the discrete particles of the liquid and to disintegrate the structure of the particles as they strike the surface of the wall. After impact the liquid forms a film which drains down over the surface of the wall. The wall may be heated so as to impart heat to the liquid. Whether done at atmospheric pressure or under reduced or increased pressure or in an atmosphere of an inert gas, the process exposes a large surface of each particle to the surrounding atmosphere and thus facilitates interchange between the liquid and the atmosphere. Such interchange may be simply an interchange of heat or it may involve gasification, degasification, dehydration, solution of a vapor or gas into the liquid, or distillation of the liquid so as to bring the liquid into equilibrium with the surrounding atmosphere.

The liquid is sprayed outwardly against the vertical wall from a disc or rotor operated at high speed. The spray is of uniform density on all sides of the disc. The liquid is fed onto this disc at such a rate that it is projected by means of centrifugal force in the form of finely divided particles or droplets. On striking the wall these particles are broken up or disintegrated into particles of smaller size. The force of the impact is sufficient to overcome the surface tension of the liquid so that the particles are further broken up or disintegrated thereby exposing a much larger surface of the liquid to the atmosphere. When the operation is carried out under a vacuum the gases and lower boiling constituents within the liquid are almost instantaneously released so that there is no objectionable foaming of the liquid during the process and the rate of distillation is vastly increased. When liquids containing bacteria to be rendered sterile are thus treated, the force of the impact, together with exposure to high vacuum brings about almost instantaneous expansion of the low boiling point fluids within the bacteria or cell structure to an extremely high degree, thereby causing them to explode and rendering the liquid sterile.

This equipment in which the force of the impact of the liquid on the wall is derived by imparting energy to the liquid by means of centrifugal force may be termed a centrifugal impactor, and is referred to herein as a centrapactor. The centrapactor may be constructed so as to comprise a single stage or it may comprise a series of stages so that the material treated is subjected to the centrifugal impaction any given number of times. The temperature of the wall against which the liquid is thrown may be regulated and by raising its temperature as the spray is repeatedly thrown against it or by otherwise changing the operating conditions, the treatment may be made progressive.

If the operation is conducted in vacuo, the liquid is rendered gas-free in the first stage of the treatment. Treatment in the centrapactor whether in a vacuum or in an atmosphere of inert gas is recommended for the treatment of liquids which are susceptible to deterioration by oxidation, or which include ingredients which are so susceptible. Whatever the nature of the treatment, the liquid is spread as a film over a substantially vertical surface within the reaction vessel. In a multiple stage operation the liquid collected from one filming stage is immediately reimpacted and again collected as a film. Thus frothing of the liquid is prevented. The nature of the treatment carried on within the centrapactor is susceptible to wide variations as are the conditions of treatment.

One preferred use of the centrapactor which is described and claimed in my co-pending application Ser. No. 13,184, filed March 5, 1948, is in the treatment of a hydrogenated fat which is to serve as a vehicle for the administration of vitamins or other food supplements which are subject to rapid deterioration. Treatment in the centrapactor almost immediately removes the air and moisture from the hydrogenated fat. The operation may be so conducted that simultaneously with the removal of the air the vehicle is heated so that light volatiles are removed. The operation is advantageously conducted under greatly reduced pressure, and if so, organisms contained in it will explode as they are impacted against the wall, rendering the fat sterile.

The equipment lends itself readily to the rapid and thorough sterilization of heat-deteriorated liquids such as milk, orange juice, and juices of vegetables and other fruits. The sterilization is effected so rapidly and at such low temperatures that its taste is not appreciably altered. The surface of the liquid exposed to the surface of the heating plate is so great that the heat transfer takes place almost instantly without injurious effects.

The equipment is likewise particularly well adapted to the sterilization of milk, fruit juices, water, and other liquids which contain organisms which are to be destroyed. The liquid is maintained at any suitable pressure for a sufficient length of time to thoroughly impregnate the organisms. Then by passing the liquid through the centrapactor operated at greatly reduced pressure, the impact of the liquid against the wall, accompanied by the expansion of the fluid content of the organisms due to their being transferred to a much rarer atmosphere, causes the organisms to explode as they are impacted against the wall.

Other operations which may be very successfully carried on within the centrapactor include the distillation of essential oils without appreciable effect on their taste components, and the distillation of other liquids where sharp fractionation of constituents of different boiling point is desired. Thus, the equipment lends itself to a wide variety of treatments. Several of these will be more particularly described in what follows. The description will include reference to the accompanying drawings, in which Fig. 1 is an elevation of the centrapactor partly broken away;

Fig. 2 is a section on the line 2—2 of Fig. 1;

Fig. 3 is a side view of one of the heating elements of Fig. 2;

Fig. 4 is a section on the line 4—4 of Fig. 2;
Fig. 5 is a section on the line 5—5 of Fig. 2;
Fig. 6 is a section on the line 6—6 of Fig. 2;
Fig. 7 is a section on the line 7—7 of Fig. 2;

Fig. 8 is a plan view of the centrifugal impeller used within the centrapactor;

Fig. 9 is a section on the line 9—9 of Fig. 8; and

Figures 10, 11:
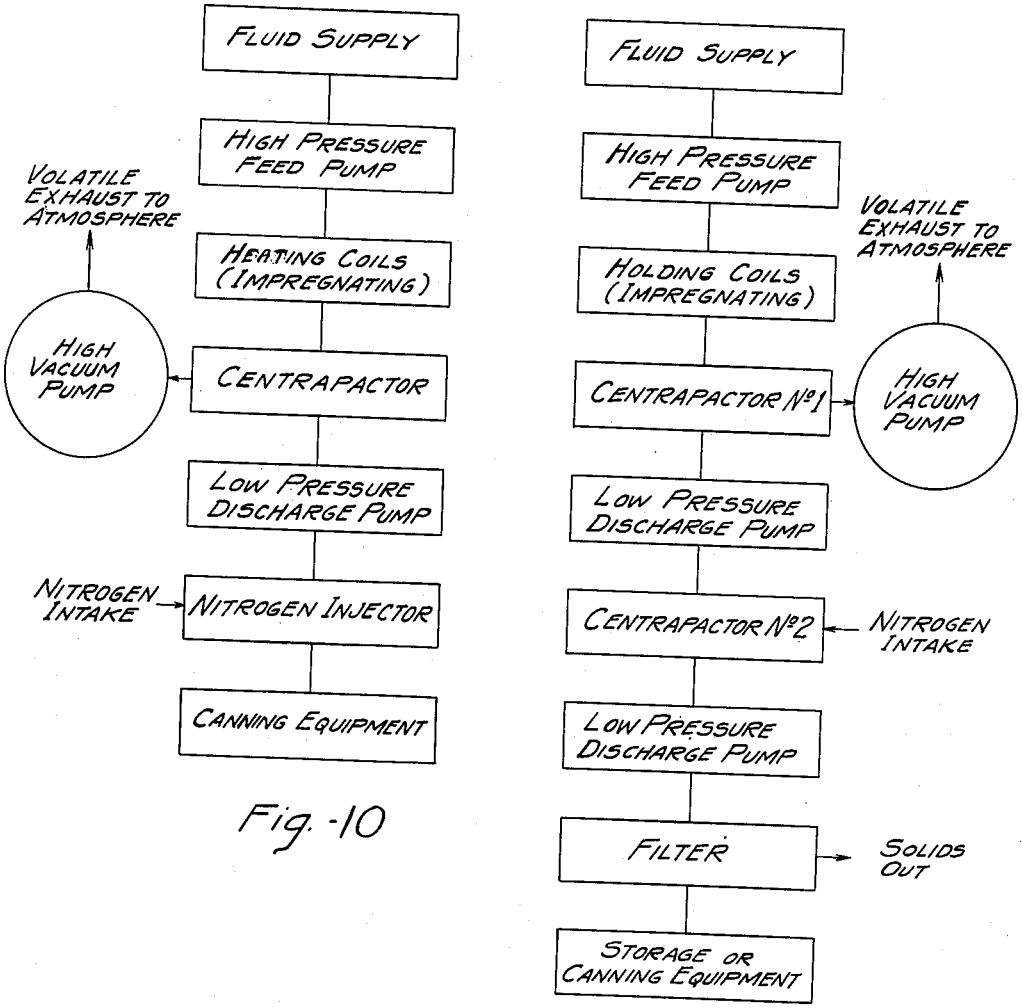

Figs. 10 and 11 are flow sheets showing how the centrapactor may be used in different processes of sterilization.

The centrapactor is formed with a shell 1, which is provided with openings 2, equipped with sight glasses. The valve 3 connects the interior of the equipment with a vacuum pump (not shown). In between the centrapactor and this valve is another vacuum pump 5. The latter is preferably of the molecular diffusion type which is designed to draw an exceedingly high vacuum approaching absolute vacuum. This may be less than 1 centimeter of mercury and may be in the neighborhood of .001 millimeters, depending on the process desired.

The usual methods of accomplishing dehydration and degasification, etc., of liquids are carried out while the liquids are in a static state or flowing in thin films over heated surfaces and usually the processes are carried out in a vacuum. Considerable frothing results with slow release of any gas. If the materials be subject to oxidation such as fruit juices, milk, essential oils, hydrogenated fats, etc., the long period of heating changes the flavor or keeping qualities, etc. Pasteurization may be accomplished but not sterilization which at the required temperature (350° F.) changes the palatability of the fluid.

The centrapactor is designed so as to heat, evacuate and remove occluded gases at an extremely rapid rate, and while the liquid is in an extremely finely divided state. A large amount of energy is imparted to the liquid by centrifuging. If the centrapactor be under a high vacuum and the plates be heated, the impact of the stream on the heated plates disintegrates the particle structure of the liquid practically instantaneously, releasing low-boiling constituents. There is substantially no frothing. Conditions may be controlled to effect sterilization and there may be concentration of the liquid such as milk or a fruit juice, or distillation such as may be desired in the treatment of oils, etc. The operation may be effected in one or more stages with or without recirculation of the treated material. Temperature and pressure may be controlled within wide limits.

Figure 1:
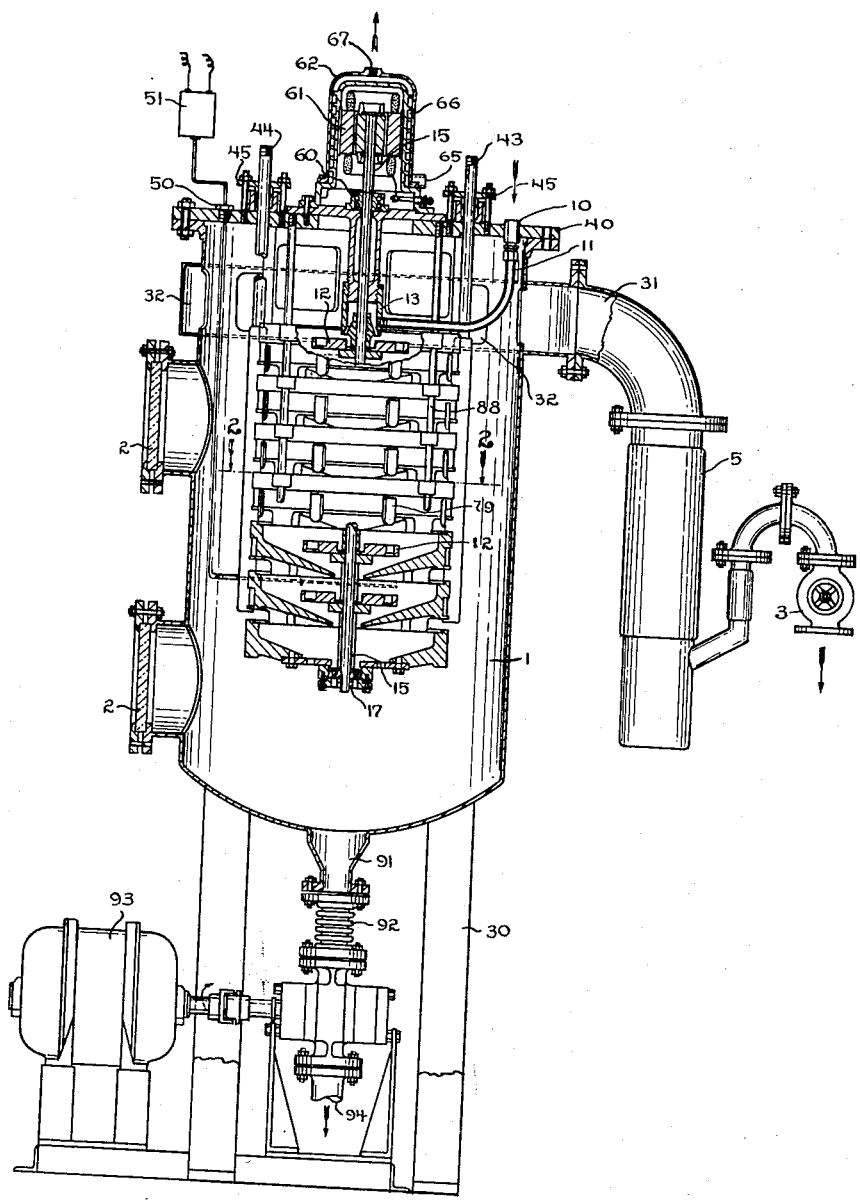

The liquid is supplied through the inlet 10, thence through conduit 11 on to the distributing plate or impact rotor 12 by way of the valve 13, the opening in which is adjustable to deliver the liquid on to the top rotor in a finely divided state. Thus, the liquid is supplied uniformly to the rotor and is sprayed uniformly in extremely finely divided particles from the edge of the rotor. In Fig. 1 the top plate of the centrapactor is broken away to show the location of this plate or rotor 12. There are six sections to the centrapactor shown in Fig. 1 and there is a similar distributing plate inside each section except the bottom one. The bottom two plates are broken away in Fig. 1 to show the distributing plates 12 within them. The construction of these distributing plates is shown in Figs. 8 and 9. The drive shaft 15, which supports the individual plates, passes down through the centrapactor and is supported at the bottom in the bearing 17.

On each of the rotors 12 are the vanes 23 which divide and project the liquid outwardly as it is fed on to the rotors. These vanes may be welded or otherwise fastened to the sleeve 24, which is riveted or bolted, or otherwise fastened to the shaft 15. Figs. 8 and 9 illustrate setscrews 25 holding the sleeve 24 of each rotor to the shaft 15.

The shell 1 is of rugged construction. It may, for example, be a steel tank no less than ⅜ inch thick with dished heads, and forged flanges suitably braced on the interior to withstand substantially absolute vacuum. It is mounted on the heavy iron supports 30.

The exhaust pipe 31 which leads to the vacuum pump connects with the perforated ring 32 which insures a substantially uniform removal of vapors from all sides of the shell. The top 40 is removable and is of heavy construction and is bolted in place. The heating conduits 43 and 44 lead down through the head 40 through packing glands 45. There is a thermocouple connection 50 through which wires pass which connect the gauge 51 with a thermocouple located at their lower end. Several thermocouples may be provided at different levels and in this case means will be provided for reading the temperature at the various levels.

The shaft 15 rises up through the radial thrust bearing 60 where it is driven by motor 61. This motor is covered by a gas-tight dome 62. Thus no packing is necessary where the shaft 15 passes through the top of the shell 1. The motor is cooled by water introduced through the opening 65 in the bottom of the dome. It passes up through the coil 66 imbedded in the shell of the dome and passes out through the opening 67 at the top of the motor.

At each level within the centrapactor there is a heating unit so that the temperature at each level may be individually controlled. Three lead lines 70, 71 and 72 (Fig. 3), located in each of the conduits 43 and 44 are connected in any usual manner with the individual heating elements 75 and 75a. As shown in Fig. 2, at each level there are two heating elements. The element 75 is electrically energized by the lead lines passing through the conduit 44 and current is supplied to the heating element 75a from the lead lines which pass down through the conduit 43. These heating elements as shown in Fig. 5 comprise a metal shell 77 which is hermetically sealed and contains coils 78 of any standard design. The clips 79 (Figs. 1, 2 and 6) hold the shells in place.

At each level is a circular casing 80 (Fig. 2). It is provided with a vertical inner wall 81 (Fig. 4) against which the liquid is thrown from the rotor 12. The liquid drains from this wall down the sloping bottom 82. From here it drops on to the rotor below it and the operation is repeated. Each of the plates 80 rests in the annular groove 85 (Fig. 7) in the top of the plate below it. The various plates are held together by the rods 88 (Figs. 2 and 7) of which there are four, evenly spaced around the centrapactor and attached to the top head 40. At each level there are two openings 90 for the insertion of a thermocouple if desired.

The top head 40 is flat and has finely machined surfaces so that the various parts may be accurately placed. The shell 1 is constructed with a dished bottom and directs the flow of the treated liquid to the nozzle 91 which is connected through the flexible coupling 92 to the conventional discharge pump 93 which delivers the treated liquid through the outlet 94. The flexible coupling permits expansion and contraction of the shell 1 and alignment with the pump 93 at all times.

The liquid flows by gravity into the suction side of the pump 93. Otherwise the high vacuum might cause the pump to become starved. The pump 93 is supplied with a spring-loaded pressure regulating valve so that it always discharges the liquid under positive pressure.

The plates 80 are preferably cast of aluminum or stainless steel. The mounting of the shaft 15 is full ball bearing. Any leakage of gas up through the bearing 60 does no harm because the dome 62 prevents escape of the gases to the atmosphere. The conduits 43 and 44 are all sealed against leakage. Seams and connections are preferably double-welded and peened.

The liquid fed through the opening 10 is distributed on to the top distribution plate 12. This plate may be 12 inches in diameter and rotated at, for example, a speed of 3600 R. P. M. The feed of the oil is so regulated that it is projected in discrete particles against the wall 81 (Fig. 4) of the upper plate which may be 20 inches in diameter. The force of the impact is such as to overcome the surface tension of the particles and each particle disintegrates as it hits the wall. If the centrapactor is operated under high vacuum (and it may be operated at a pressure of only a small fraction of a centimeter of mercury, usually .001 millimeters of mercury or less), any gases, low-boiling constituents, etc. are liberated almost instantaneously and without prolonged heating. If the centrapactor is filled with an inert gas the liquid is saturated with the gas almost instantaneously. Thus the centrapactor brings the gas and liquid into equilibrium almost instantaneously.

In the vacuum treatment of hydrogenated soya bean oil, in preparing it for use as a vehicle for vitamins, etc., the hydrogenated oil or fat in the first stage of the centrapactor treatment is preferably at about 140° F. Thus as each particle is impacted on the heated surface any lower boiling constituents in the fat are substantially immediately volatilized and any air, hydrogen, or other gas is liberated.

As the oil progresses from the top plate to the lower plates it is gradually heated. For example, the temperatures of the plates of a six-plate centrapactor such as illustrated may be maintained at the following temperatures for the treatment of such a hydrogenated fat:

| | °F. |
|---|---|
| Top plate | 140 |
| Second plate | 160 |
| Third plate | 170 |
| Fourth plate | 180 |
| Fifth plate | 190 |
| Sixth plate | 200 |

With the various plates maintained at about the temperatures indicated it will be seen that the fluid being treated is held in the form of finely divided particles for a sufficient length of time for supplying the desired amount of heat to effect the removal of the desired constituents of contaminants without frothing or causing any deleterious substances to be formed by overheating in the presence of oxygen.

The action of impacting the particles also aids in effecting the heat transfer and virtually explodes the particles, due to the rupture of the film of liquid which surrounds gases or vapor contained within them; consequently partial distillation may be carried out at a relatively low temperature and extremely high rate due to the high rate of heat transfer and absence of frothing. Also, the absence of frothing simplifies the use of extremely high vacuum. Sudden exposure of any fluid-impregnated cell or bacteria explodes them, as previously explained.

Thus, the molten fat which has been sterilized, degasified and purified by removal of lower-boiling constituents, is discharged from the bottom of the centrapactor. The pump 93 may be run continuously or intermittently to transfer the treated fat to an appropriate vessel.

Fig. 10 is a flow diagram illustrating general steps employed in the sterilization of milk, fruit juice, water or other liquid which contains as contaminants microorganisms such as anaerobic bacteria, virus and unicellular structures. The milk may be concentrated simultaneously with pasteurization and sterilization, depending on the temperature employed.

For example, referring to Fig. 10 the milk in admixture with an inert gas such as nitrogen is fed under high pressure through heating coils or in an autoclave or the like where it becomes saturated with the gas. Alternatively, the milk may be subjected to a hydrostatic pressure of, for example, 100 pounds up to 10,000 pounds per square inch, for instance, to impregnate bacteria, etc. with water under this pressure. From here the liquid is fed to a centrapactor maintained at a pressure near absolute zero; e. g., a few hundredths of a millimeter. This causes expansion to take place within any organic contaminants within the liquid sufficient to explode them. Gas within the contaminants may expand several hundred thousand fold. By any treatment approaching this, seeds, spores, etc., as well as bacteria in the milk will be destroyed by rupture of cells within them. If a liquid other than water is being treated, the latent heat of vaporization may be supplied by impacting a heated wall, so that the liquid may be concentrated simultaneously. The whole operation is quickly consummated without appreciably affecting the taste of the milk or fruit juice, etc., because at low pressures in the range mentioned the milk, etc. need not be heated to an injurious degree. Upon completion of the treatment in the centrapactor the milk is in a degasified condition and is then passed through a nitrogen injector which is operated at slightly above atmospheric pressure. The liquid quickly takes up the nitrogen. The milk then goes to canning or other packing equipment where it is sealed in containers in the presence of an inert atmosphere while in a sterile condition.

Fig. 11 is a flow sheet of a somewhat comparable operation, except that after being sterilized and degasified, and possibly also concentrated in Centrapactor No. 1, the milk or other liquid passes into a second centrapactor where it is saturated with nitrogen.

The milk, etc., after being sterilized, during which operation it is degasified and dehydrated to the desired degree in evacuated Centrapactor No. 1, is removed by means of the low-pressure pump No. 1 and discharged therefrom into Centrapactor No. 2 while in an evacuated condition. Centrapactor No. 2 is charged with nitrogen at 5 pounds per square inch which replaces the air or gas removed in Centrapactor No. 1 and the charged milk is then removed by the low-pressure pump No. 2 and directed to canning equipment. This prevents loss of nitrogen On leaving Centrapactor No. 2 the milk is advantageously filtered to remove exploded particles and other filterable contaminants.

The operation of this flow sheet illustrated in Fig. 11 lends itself to the concentration of fruit juices such as orange juice, etc. The temperature and pressure in Centrapactor No. 1 will be controlled to give a sterile product of desired concentration which will be accomplished so quickly and at such low temperature that the taste of the orange juice, etc. is not impaired.

Milk, orange juice and water inoculated with different types of bacteria were treated. Starting with each liquid at 100° F. and a hydrostatic pressure of 5000 pounds per square inch and rapidly changing to a temperature of 40° to 50° F. and 29.75 inches vacuum, each liquid was rendered sterile. No cultures were obtainable, indicating destruction of all bacteria.

In the treatment of fruit juices, for example, it has been found that not only is the liquid rendered sterile but the enzymes are also rendered inactive and the product is homogenized. The process may be carried out as follows with orange juice or other citrus fruit juice under a high vacuum within the range of five-tenths of an inch of absolute vacuum. Primarily homogenization is accomplished by passing the fluid under high pressure through the feed control valve 13. The first and second stages of treatment remove air and other highly volatile substances and initiate sterilization at a relatively low temperature of approximately 100° F. The next two stages destroy any enzymes present with a temperature of approximately 200° F. and finally sterilize the fluid. The final two stages may operate at a temperature of 60° F. or less. During the entire cycle the light volatile essential oils are removed to arrest rancidity and the final product is charged with an inert gas prior to packaging.

The particular design of equipment illustrated and described is subject to modification. The processes likewise are subject to modification and some of them may be carried out in different types of equipment. The invention is defined in the claims which follow.

What I claim is:

1. The method of treating a liquid which comprises centrifugally projecting the liquid from a central revolving source of supply in a substantially horizontal plane in all direction in the form of discrete particles against a substantially vertical surface with sufficient impact to disintegrate each particle into smaller particles, thereby substantially instantaneously bringing the contents of each of said particles into substantial equilibrium with the surrounding atmosphere.

2. The method of treating a liquid which comprises centrifugally projecting the liquid from a central revolving source of supply in a substantially horizontal plane in all directions in the form of discrete particles against a substantially vertical surface with sufficient impact to disintegrate each particle into smaller particles, thereby substantially instantaneously bringing the contents of each of said particles into substantial equilibrium with the surrounding atmosphere and allowing the liquid to drain from the surface as a film.

3. The method of treating a liquid which comprises centrifugally projecting the liquid from a central revolving source of supply in a substantially horizontal plane in all directions in the form of discrete particles against a substantially vertical surface with sufficient impact to disintegrate each particle into smaller particles, thereby substantially instantaneously bringing the contents of each of said particles into substantial equilibrium with the surrounding atmosphere, and imparting heat to the liquid from the surface while in contact therewith.

4. The method of treating a liquid which comprises centrifugally projecting the liquid from a central revolving source of supply in a substantially horizontal plane in all directions in the form of discrete particles against a substantially vertical surface with sufficient impact to disintegrate each particle into smaller particles, thereby substantially instantaneously bringing the contents of each of said particles into substantial equilibrium with the surrounding atmosphere, and maintaining the liquid under a high vacuum from the time it is so projected as particles until it is impacted against the surface.

5. The method of treating a liquid which comprises repeatedly and continuously centrifugally projecting the liquid from coaxial sources of supply in successively lower substantially horizontal planes in all directions in the form of discrete particles through the same atmosphere while changing the atmosphere, against successively lower levels of the same vertical wall with sufficient impact to disintegrate each particle into smaller particles, collecting liquid sprayed in higher of said planes and respraying it in lower of said planes, and at each impact of liquid against the wall bringing the liquid substantially into equilibrium with the surrounding atmosphere.

6. The method of rendering sterile a liquid contaminated with matter of the class consisting of bacteria and cellular matter which comprises impregnating the contaminant with fluid under pressure above atmospheric, then with the contaminant so impregnated, projecting the liquid from a central revolving source of supply in a substantially horizontal plane, in a high vacuum, in all directions, in the form of discrete particles against a substantially vertical wall with sufficient impact to explode the contaminant, thereby rendering the liquid sterile.

7. The method of rendering sterile water contaminated with matter of the class consisting of bacteria and cellular matter which comprises impregnating the contaminant with fluid under pressure above atmospheric, then with the contaminant so impregnated, projecting the water from a central revolving source of supply in a substantially horizontal plane, in a high vacuum, in all directions, in the form of discrete particles against a substantially vertical wall with sufficient impact to explode the contaminant, thereby rendering the water sterile.

8. The method of rendering sterile milk contaminated with matter of the class consisting of bacteria and cellular matter which comprises impregnating the contaminant with fluid under pressure above atmospheric, then with the contaminant so impregnated, projecting the milk from a central revolving source of supply in a substantially horizontal plane, in a high vacuum, in all directions, in the form of discrete particles against a substantially vertical wall with sufficient impact to explode the contaminant, thereby rendering the milk sterile.

9. The method of rendering sterile fruit juice contaminated with matter of the class consisting of bacteria and cellular matter which comprises impregnating the contaminant with fluid under pressure above atmospheric, then with the contaminant so impregnated, projecting the fruit juice from a central revolving source of supply in a substantially horizontal plane, in a high vacuum, in all directions, in the form of discrete particles against a substantially vertical wall with sufficient impact to explode the contaminant, thereby rendering the fruit juice sterile.

10. The method of rendering sterile milk contaminated with matter of the class consisting of bacteria and cellular matter which comprises impregnating the contaminant with fluid under pressure above atmospheric, then with the contaminant so impregnated, projecting the milk from a central revolving source of supply in a substantially horizontal plane, in a high vacuum, in all directions, in the form of discrete particles against a substantially vertical wall with sufficient impact to explode the contaminant, thereby rendering the milk sterile, and imparting heat to the milk from the surface of the wall by contact therewith so as to concentrate the milk.

11. The method of rendering sterile fruit juice contaminated with matter of the class consisting of bacteria and cellular matter which comprises impregnating the contaminant with fluid under pressure above atmospheric, then with the contaminant so impregnated, projecting the fruit juice from a central revolving source of supply in a substantially horizontal plane, in a high vacuum, in all directions, in the form of discrete particles against a substantially vertical wall with sufficient impact to explode the contaminant, thereby rendering the fruit juice sterile, and imparting heat to the fruit juice from the surface of the wall by contact therewith so as to concentrate the fruit juice.

12. The process of sterilizing a liquid contaminated with organisms, which comprises accustoming the organisms to a gas at any given pressure so that the gas is in them at this pressure, then centrifugally projecting the liquid containing them horizontally in an atmosphere at a pressure of less than one millimeter of mercury, against a substantially vertical wall with sufficient impact to explode the organisms.

13. The process of treating a citrus fruit juice which comprises homogenizing the juice and simultaneously degasifying it, heating to a sufficient temperature in excess of 100° F. to sterilize and destroy enzyme activity and simultaneously volatilizing light volatile essential oils, all of said steps being carried out under a pressure of not more than $\frac{5}{10}$ of an inch of water and then cooling.

14. The process of producing a concentrated citrus fruit juice which comprises homogenizing the juice and simultaneously degasifying it, heating to a sufficient temperature in excess of 100° F. to sterilize and destroy enzyme activity and simultaneously volatilizing light volatile essential oils and a sufficient quantity of water to produce a desired amount of concentration, all of said steps being carried out under a pressure of not more than $\frac{5}{10}$ of an inch of water and then quickly cooling.

15. The method of treating a liquid which comprises repeatedly and continuously centrifugally projecting the liquid from a coaxial source of supply in successively lower substantially horizontal planes in all directions in the form of discrete particles through the same atmosphere while changing the atmosphere, against successively lower levels of the same vertical wall with sufficient impact to disintegrate each particle into smaller particles, collecting liquids separated in higher of said planes and respraying it in lower of said planes and at a plurality of the planes regulating the temperature of the liquid.

16. Apparatus for the treatment of liquid which comprises a central shaft, means for rotating the same at high speed rotors fastened thereto one above another, means for feeding liquid to the top rotor, means for collecting liquid projected from each rotor and feeding it on to the rotor directly below it and means for individually controlling the temperature of a plurality of said collecting means.

References Cited in the file of this patent

UNITED STATES PATENTS

| Number | Name | Date |
|---|---|---|
| 230,525 | Brinton | July 27, 1880 |
| 608,425 | Graf | Aug. 2, 1898 |
| 1,369,345 | Lobeck | Feb. 22, 1921 |
| 1,438,502 | Peebles | Dec. 12, 1922 |
| 1,567,274 | Kitchen | Dec. 29, 1925 |
| 1,658,168 | Kitchen | Feb. 7, 1928 |
| 1,888,872 | Y'Arnett | Nov. 22, 1932 |
| 2,064,650 | Emanueli | Dec. 15, 1936 |
| 2,119,616 | Wightman | June 7, 1938 |
| 2,333,712 | Eckey | Nov. 9, 1943 |
| 2,349,777 | Utterback et al. | May 23, 1944 |
| 2,368,049 | Stratford | Jan. 23, 1945 |

FOREIGN PATENTS

| Number | Country | Date |
|---|---|---|
| 197,548 | Canada | Feb. 24, 1920 |
| 16,508 | Australia | Feb. 23, 1934 |
| 879,065 | France | Feb. 12, 1943 |